United States Patent
Suzuki et al.

(10) Patent No.: US 6,753,924 B1
(45) Date of Patent: Jun. 22, 2004

(54) OSCILLATION SIGNAL PROCESSING APPARATUS, TELEVISION APPARATUS AND OSCILLATION SIGNAL PROCESSING CONTROL METHOD

(75) Inventors: Hirotsugu Suzuki, Daito (JP); Kazuhiko Yamamoto, Daito (JP)

(73) Assignee: Funai Electric Co., Ltd., Daito (JP)

( * ) Notice: Subject to any disclaimer, the term of this patent is extended or adjusted under 35 U.S.C. 154(b) by 637 days.

(21) Appl. No.: 09/684,910

(22) Filed: Oct. 10, 2000

(30) Foreign Application Priority Data

Oct. 8, 1999 (JP) .......................................... 11-007683

(51) Int. Cl.$^7$ ................................................ H04N 9/45
(52) U.S. Cl. ...................................... 348/505; 348/507
(58) Field of Search ........................ 34/539, 549, 505, 34/506, 507, 508, 509, 536, 638, 726, 727

(56) References Cited

U.S. PATENT DOCUMENTS

| | | | | |
|---|---|---|---|---|
| 4,544,943 A | * | 10/1985 | Quan | 348/507 |
| 5,353,066 A | * | 10/1994 | Lee | 348/505 |
| 5,481,313 A | * | 1/1996 | Kim | 348/505 |
| 5,987,209 A | | 11/1999 | Higuchi | |

FOREIGN PATENT DOCUMENTS

| | | |
|---|---|---|
| JP | 3-53050 | 5/1991 |
| JP | 6-70247 | 3/1994 |
| JP | 8-32882 | 2/1996 |
| JP | 8-125944 | 5/1996 |
| JP | 8-149385 | 6/1996 |
| JP | 9-18796 | 1/1997 |

* cited by examiner

*Primary Examiner*—Michael H. Lee
(74) *Attorney, Agent, or Firm*—Crowell & Moring LLP (57) ABSTRACT

In a conventional construction to obtain a reference signal for a tuner and a subcarrier for color difference signal demodulation by only one quartz oscillator, the reference signal is unstable due to a PLL operation for oscillation of the subcarrier, which causes tuning error or tuning shift. To realize stable tuning operation, in an oscillation signal processing apparatus having a construction to use one quartz oscillator to obtain a reference signal for a tuner and a subcarrier to demodulate a color difference signal, a PLL operation is performed with the quartz oscillator and a color burst signal when the tuning operation is not performed, while a phase comparison operation is stopped and oscillation is fixed to 3.58 MHz when the tuning operation is performed.

6 Claims, 6 Drawing Sheets

OSCILLATION SIGNAL PROCESSING APPARATUS, TELEVISION APPARATUS AND OSCILLATION SIGNAL PROCESSING CONTROL METHOD

BACKGROUND OF THE INVENTION

1. Field of the Invention

The present invention relates to an oscillation signal processing apparatus, and more particularly, to an oscillation signal processing apparatus which obtains a tuner reference signal and a subcarrier by oscillating one quartz oscillator included in a television apparatus, a television apparatus using the oscillation signal processing apparatus, and an oscillation signal processing control method.

2. Description of the Prior Art

Figure 6:
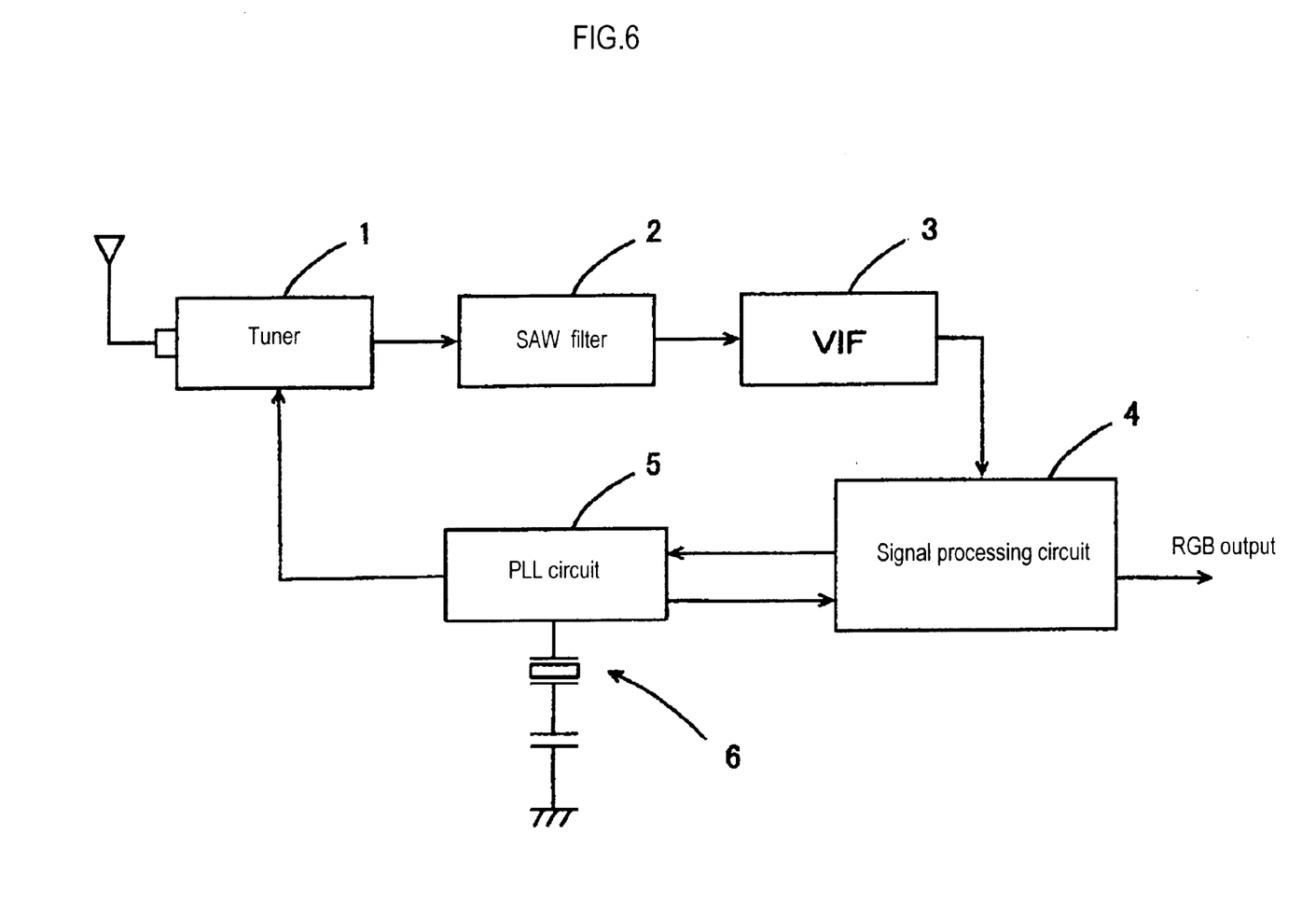
FIG. 6 is a block diagram showing the principal elements of the conventional television apparatus.

FIG. 6 is a block diagram showing the arrangement of principal elements of a conventional television apparatus having a circuit to oscillate one quartz oscillator to oscillate a tuner reference signal and a subcarrier to demodulate color difference signal. In FIG. 6, a tuner 1 is connected to a SAW filter 2 and a PLL circuit 5. A television broadcast signal is received via an antenna, and based on the received signal, an intermediate frequency signal is outputted. The tuner 1, having a so-called PLL tuning mechanism, obtains a desired local oscillation frequency with the output signal from the PLL circuit 5 as a reference.

The intermediate frequency signal outputted from the tuner 1 is inputted via the SAW filter 2 and a VIF circuit 3 into a signal processing circuit. Through correction by the SAW filter 2 then a predetermined amplification by the VIF circuit 3, the signal is inputted into a signal processing circuit 4. The signal processing circuit 4 detects an input video intermediate frequency signal and outputs RGB signals. Upon signal detection, a subcarrier to demodulate a color difference signal from a carrier chrominance signal is obtained from the PLL circuit 5 connected to the signal processing circuit 4. The signal processing circuit 4 also outputs a color burst signal as a reference signal for oscillation of the subcarrier to the PLL circuit 5.

The PLL circuit 5 is connected to a quartz oscillator 6, and feed-back controls an oscillation signal from the quartz oscillator 6 with the input color burst signal as a reference signal. As a result, an oscillation signal synchronized with the color burst signal is outputted, and the oscillation signal is used as a reference signal for the subcarrier inputted into the signal processing circuit 4 and for the tuner 1. That is, to obtain the reference signal in the tuner and the subcarrier in signal detection, any oscillation mechanism is necessary. In the oscillation signal processing apparatus of the conventional art, the common quartz oscillator 6 is used for obtaining both oscillation signals.

On the other hand, Japanese Published Unexamined Utility Model Registration No. Hei 3-53050 discloses a technique to obtain a subcarrier by inputting a color burst signal, based on a video intermediate frequency signal generated via a tuner and a VIF circuit, into a PLL circuit having an APC (Automatic Phase Control) filter and VCO (Voltage Controlled Oscillator). The time constant of the APC filter is variable. In this construction, the response speed of the PLL circuit is changed by changing the time constant of the APC filter in a just-tuning period and in a non-just-tuning period, thus preventing occurrence of tuning noise.

The conventional oscillation signal processing apparatuses have the following problems.

That is, in the former conventional art, the tuner 1 and the signal processing circuit 4 can be driven by only one quartz oscillator 6, however, in the PLL circuit 5, in a case where noise is inputted or an input signal is unstable, the phase, level and the like of the oscillation signal become unstable. The instability of oscillation signal from the PLL circuit 5 causes instability of the intermediate frequency signal outputted from the tuner 1, and further causes instability in the signal inputted into the PLL circuit 5, thus causing tuning error and tuning shift.

Further, in the technique disclosed in Japanese Published Unexamined Utility Model Registration No. Hei 3-53050, although the PLL circuit can be controlled in accordance with the operation state of the tuner, there is no solution for the problem of instability in tuning operation in use of construction as in the former art to drive the tuner and the signal processing circuit by one quartz oscillator.

SUMMARY OF THE INVENTION

The present invention has been made in consideration of the above problems, and has its object to provide an oscillation signal processing apparatus capable of stable tuning operation while obtaining a tuner reference signal and a subcarrier by oscillating one quartz oscillator, a television apparatus using the oscillation signal processing apparatus, and an oscillation signal processing control method.

The above object is attained by providing an oscillation signal processing apparatus for oscillating a subcarrier to demodulate a color difference signal from a carrier chrominance signal, comprising: PLL oscillation unit that performs predetermined oscillation synchronized with a color burst signal by a predetermined PLL and outputting an oscillation output as the subcarrier; external output unit that outputs the oscillation output from the PLL oscillation unit as a reference signal for an external tuner; and PLL oscillation control unit that controls the PLL oscillation unit to stop a phase comparison operation upon start of tuning operation by the external tuner, so as to stabilize the reference signal from the external output unit.

In the present invention having the above construction, the oscillation signal processing apparatus oscillates a subcarrier to demodulate a color difference signal from a carrier chrominance signal. For this purpose, the PLL oscillation unit performs predetermined oscillation synchronized with the color burst signal by a predetermined PLL, and outputs the oscillation signal as the subcarrier. When the PLL oscillation unit outputs the oscillation signal, the external output unit outputs the oscillation output from the PLL oscillation unit as the reference signal for the external tuner. The PLL oscillation control unit controls the PLL oscillation unit upon start of tuning operation by the external tuner to stop the phase comparison operation, to stabilize the reference signal outputted from the external output unit.

That is, the oscillation signal from the PLL oscillation unit is used as the reference signal for the tuner and as the subcarrier for demodulation of color difference signal. The tuner selects only a necessary signal from a received television broadcast signal and high-frequency amplifies the selected signal, converts signal into an intermediate frequency signal and outputs the signal, in accordance with various methods. For example, in a frequency synthesizer method, phase detection is made between a signal frequency-converted from a reference signal via a fixed frequency divider, and a signal frequency-converted from an oscillation signal oscillated from a local oscillator via a variable frequency divider for frequency division in correspondence with a user's desired channel.

The frequency of the local oscillator is changed by a tuner PLL circuit which feed-back controls the local oscillator by using the result of phase detection, there by a desired local oscillation signal is obtained. Then, the local oscillation signal corresponding to the desired channel is mixed with a signal high-frequency amplified from a signal received via an antenna, into a 58.75 MHz intermediate frequency signal. Note that in the present invention, as the reference signal is the PLL oscillation signal outputted from the external output unit, if the phase and/or level of the reference signal is unstable, the reference for the tuner PLL becomes unstable, which causes instability in the output from the local oscillator, as a result, causing tuning error or tuning shift.

Accordingly, in the present invention, the output from the external output unit upon start of tuning operation is stabilized. For this purpose, the PLL oscillation unit does not perform the phase comparison operation. That is, as the PLL is used for comparing phases of the color burst signal as the reference signal and the predetermined oscillation signal to control the oscillation signal so as to eliminate a phase difference therebetween, if the comparison operation is not performed, the oscillation signal is not varied. Accordingly, a stable reference signal is used upon start of tuning operation, and tuning error can be prevented.

According to the present invention, as the tuner reference signal can be stabilized upon start of tuning operation, an oscillation signal processing apparatus capable of stable tuning operation while obtaining a tuner reference signal and a subcarrier by oscillating one quartz oscillator can be provided.

In a television apparatus using the oscillation signal processing apparatus, a stable tuning operation can be performed. Further, a similar advantage can be obtained by a similar oscillation signal processing control method other than the invention as an apparatus having a material substance.

Note that as a construction for oscillation by the PLL oscillation unit, a so-called oscillation circuit can be provided, however, it is more preferable to use a quartz oscillator which oscillates with a very stable natural oscillation regardless of variation of temperature, a power-source voltage or the like. Further, as the PLL oscillation unit, any unit can be used as long as it can output the oscillation from the quartz oscillator or the like in synchronization with a color burst signal. For example, the PLL oscillation unit may be constructed with a burst amplification circuit which performs predetermined amplification on an input intermediate frequency signal and outputs a color burst signal, a VCO circuit which oscillates the quartz oscillator in accordance with an input voltage, and an APC circuit which outputs a voltage corresponding to a phase difference between output signals from the burst amplification circuit and the VCO circuit. Further, the external output unit may be any unit as long as it outputs the oscillation output from the PLL oscillation unit as the external tuner reference signal. For example, to obtain a desired signal, the external output unit may output the PLL oscillation output to the tuner via a buffer.

Further, the PLL oscillation control unit may be any unit as long as it controls the PLL oscillation unit upon start of tuning operation by the external tuner to stop the phase comparison operation. As a particular example of this purpose, in another aspect of the present invention, the PLL oscillation unit has a burst amplification circuit to perform predetermined amplification prior to the phase comparison operation to reduce amplification variation of the color burst signal, and the PLL oscillation control unit has a switch to reduce the gain of the burst amplification circuit to a minimum.

In the aspect of the present invention, the PLL oscillation unit has the burst amplification circuit to perform predetermined amplification prior to the phase comparison operation so as to reduce the amplitude variation of the color burst signal. Further, the PLL oscillation control unit has the switch to reduce the gain of the burst amplification circuit to a minimum. As the gain is reduced to a minimum by the switch, a no-input signal state can be obtained. In this state, the phase comparison operation by the PLL is not performed, and oscillation is made in free-run frequency. Accordingly, a stable signal can be outputted to the PLL oscillation unit without influence by input noise or the like.

According to this aspect of the present invention, the phase comparison operation by the PLL can be easily stopped.

Further, in another example of the construction to stop the phase comparison operation by the PLL oscillation control unit, the PLL oscillation unit has an APC circuit which inputs the subcarrier and a signal based on the color burst signal and compares phases of both signals, and a loop filter connected to the APC circuit, and the PLL oscillation control unit has a switch to fix a voltage in a connection point between the APC circuit and the loop filter.

In the aspect of the present invention, the PLL oscillation unit has the APC circuit which inputs the subcarrier and the signal based on the color burst signal and compares the phases of both signals, and the loop filter connected to the APC circuit. That is, the construction is similar to the above construction where the PLL oscillation unit is constructed with the burst amplification circuit, the APC circuit and the VCO circuit. As the PLL oscillation control unit has the switch which fixes the voltage in the connection point between the APC circuit and the loop filter, the unit stops the phase comparison operation by the APC circuit by fixing the voltage using the switch. Accordingly, even if there is a phase difference between the color burst signal and the oscillation signal from the VCO circuit, the phase difference does not influence the oscillation signal, and the oscillation signal can be stabilized.

According to this aspect of the present invention, the phase comparison operation in the PLL can be easily stopped.

Note that it is the start of tuning operation that the external output unit stabilizes the reference signal to the tuner by the stoppage of phase comparison operation, and the phase comparison operation must be performed after proper tuning. As in an example of construction to exactly detect the start of tuning operation, the PLL oscillation control unit detects the start of tuning operation by detecting occurrence/non-occurrence of tuning operation by the user.

In the aspect of the present invention, the PLL oscillation control unit detects the start of tuning operation by detecting occurrence/non-occurrence of tuning operation by the user. That is, generally, the station-selection operation is started when the user has started station-selection operation to change the channel. Accordingly, the start of tuning operation is detected by the user's station-selection operation.

According to this aspect of the present invention, the timing to stop the phase comparison operation can be easily detected.

Note that the station-selection operation can be detected by, e.g., recognizing a signal to change the channel by a remote control unit by a microcomputer in the television apparatus. In this manner, by detecting occurrence/non-occurrence of the user's station-selection operation, the start of tuning operation can be easily detected. Further, as the user does not always perform the station-selection operation immediately after the power of the television apparatus has turned on, it is preferable to determine the period immediately after the turn-on as the start of tuning operation without any condition.

Further, when proper tuning has been made by the tuner, it is necessary to perform the phase comparison operation by the PLL oscillation unit. In a particular example for this purpose, the PLL oscillation control unit performs mode selection operation between a fixed oscillation mode to stop the phase comparison operation by the PLL oscillation unit to perform predetermined oscillation and a phase comparison oscillation mode to perform in-phase comparison operation. The PLL oscillation unit selects the fixed oscillation mode during the period from the start of tuning operation to the end of the tuning operation.

In this aspect of the present invention, the PLL oscillation control unit performs the mode selection operation between the fixed oscillation mode to stop the phase comparison operation by the PLL oscillation unit to perform the predetermined oscillation and the phase comparison oscillation mode to perform the in-phase comparison operation, and performs control to select the fixed oscillation mode during the period between the start of the tuning operation and the end of the tuning operation. As a result, the output from the external output unit is stabilized by the time proper tuning is performed. The completion of the tuning operation can be detected by using an SD signal. That is, the SD signal is outputted in accordance with judgment of non-video signal state by e.g. sampling intervals between horizontal synchronizing signals. Upon detection of the SD signal, it can be easily determined that proper tuning has been performed.

According to this aspect of the present invention, the timing to start the phase comparison operation can be easily detected.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
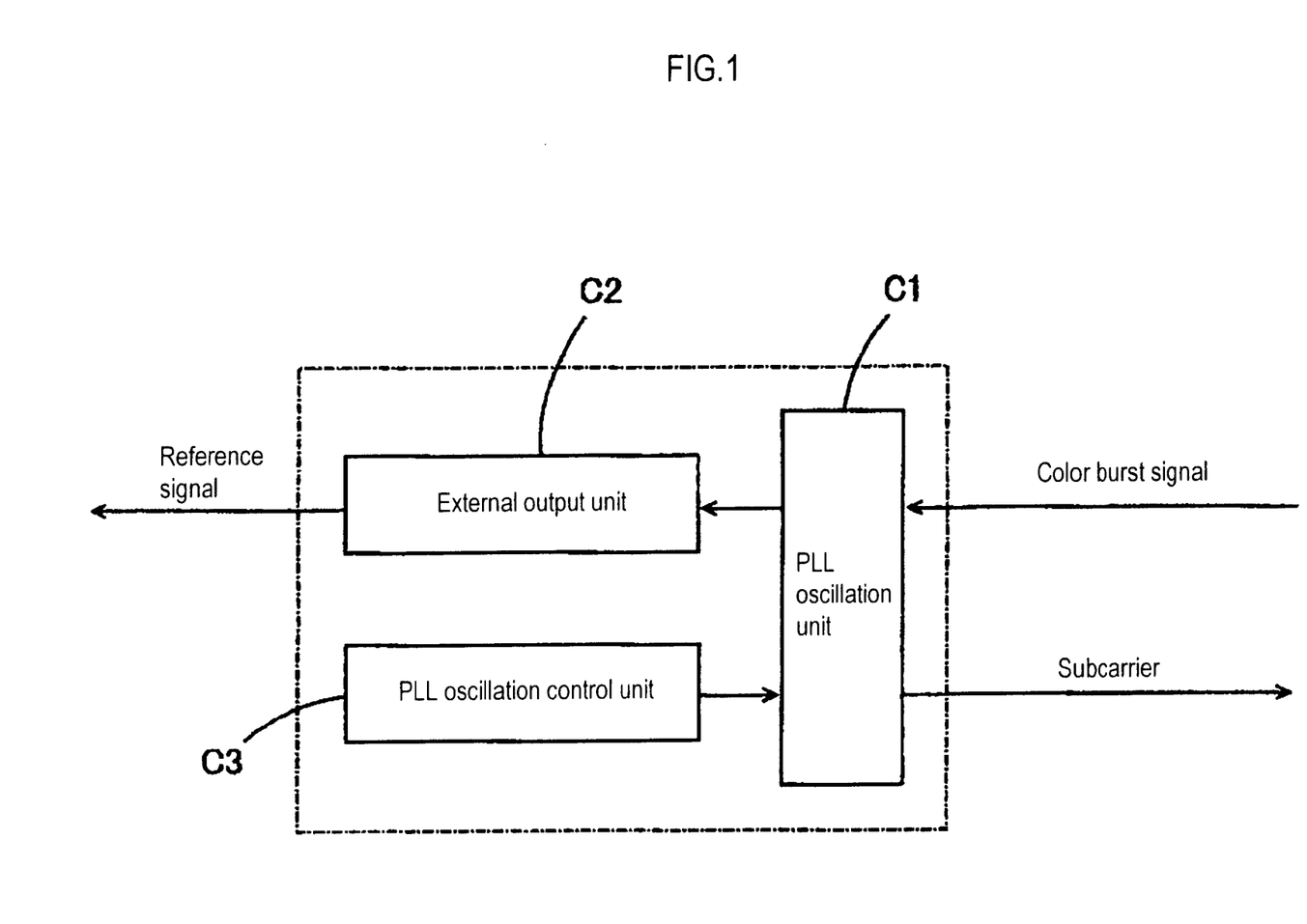
FIG. 1 is a block diagram showing an oscillation signal processing apparatus according to an embodiment of the present invention.

FIG. 1 is a block diagram showing an oscillation signal processing apparatus according to an embodiment of the present invention. In FIG. 1, the oscillation signal processing apparatus, mainly constructed with a PLL circuit, has a PLL oscillation unit C1, an external output unit C2 and a PLL oscillation control unit C3. The PLL oscillation unit C1 outputs an oscillation signal by an oscillation circuit. The PLL oscillation unit C1 outputs the oscillation signal, synchronized with an input color burst signal as a reference signal, by phase comparison, as a subcarrier.

The oscillation signal from the oscillation circuit is outputted by the external output unit C2 to an external tuner as a reference signal for local oscillation by the external tuner. The PLL oscillation control unit C3 controls the PLL oscillation unit C1 to perform or not to perform the phase comparison operation. When a tuning operation is performed by the external tuner, the PLL oscillation control unit C3 controls the PLL oscillation unit C1 not to perform the phase comparison operation. That is, the oscillation signal from the oscillation circuit, tuned with the color burst signal, varies during the phase comparison operation, and the oscillation signal is stable in a state where the phase comparison operation is not performed. Accordingly, to stable the signal which enters the tuner during a tuning operation, the phase comparison operation is stopped. As a result, tuning error and tuning shift can be prevented.

Figure 2:
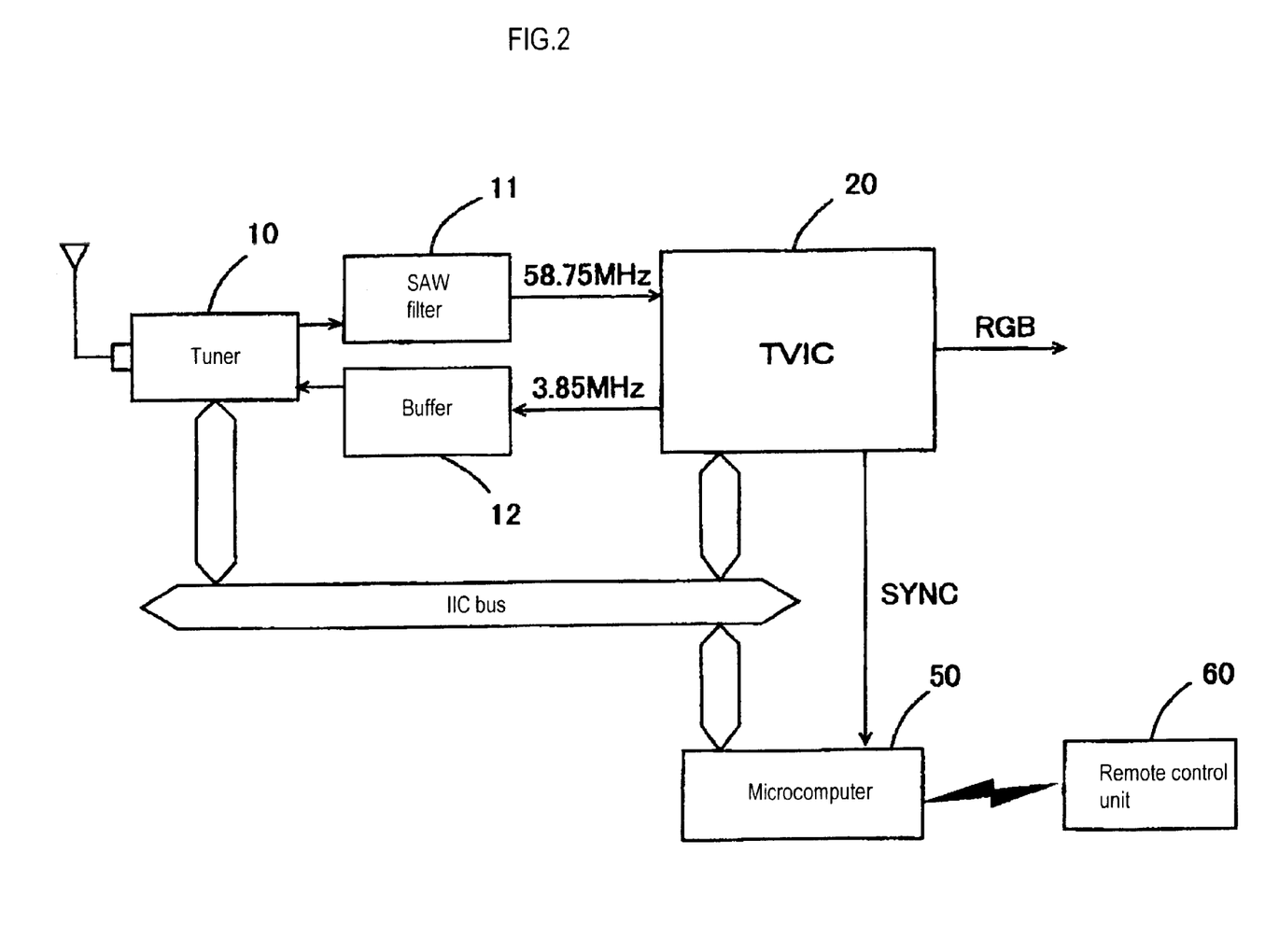
FIG. 2 is a block diagram showing principal elements of a television apparatus using the oscillation signal processing apparatus.
Figure 3:
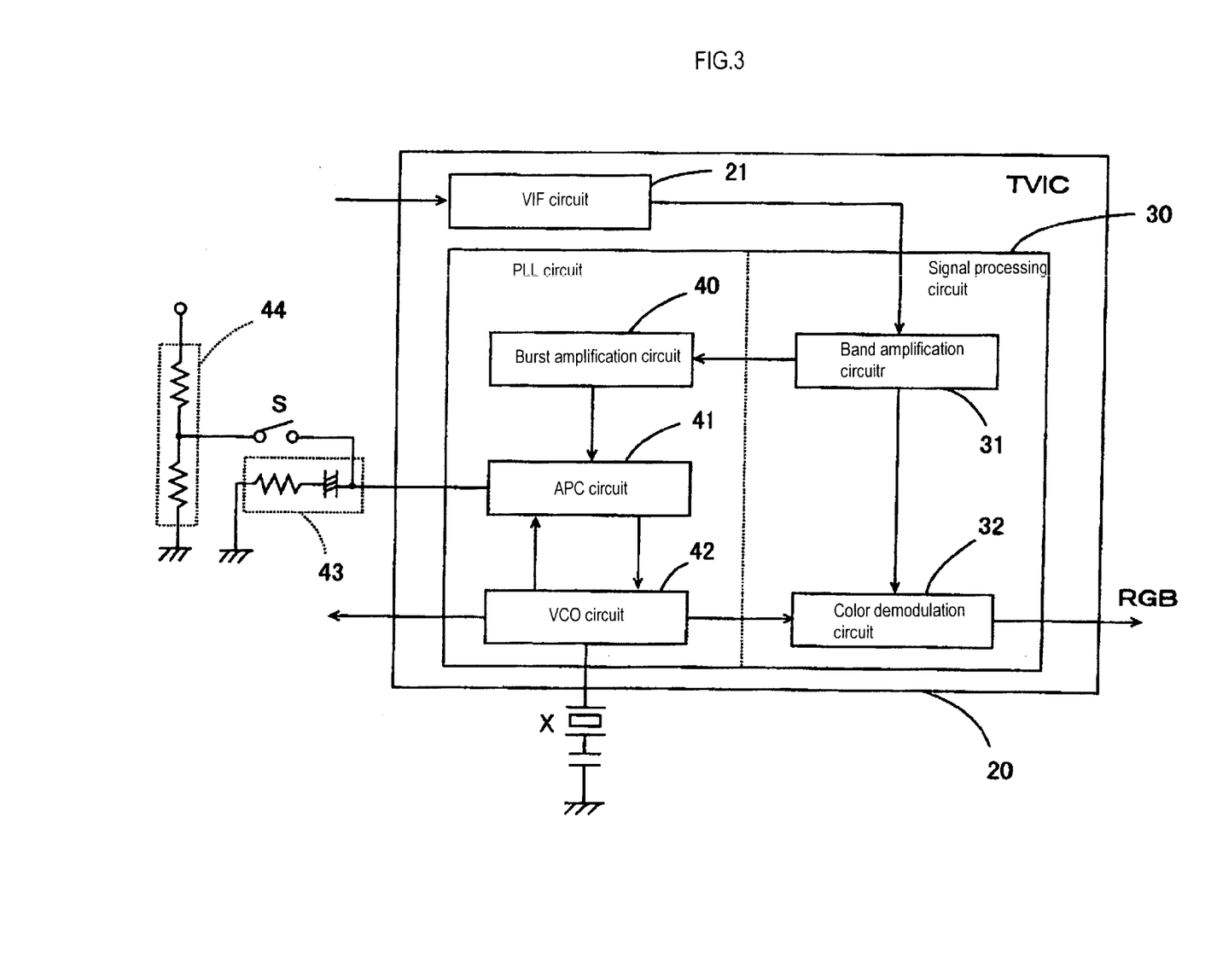
FIG. 3 is a block diagram showing the arrangement of principal elements of a TVIC.

FIG. 2 is a block diagram showing principal elements of a television apparatus using the oscillation signal processing apparatus. FIG. 3 is a block diagram showing the arrangement of principal elements of a television IC (TVIC) of the television apparatus in FIG. 2. In FIG. 2, a tuner 10 receives a signal of desired frequency corresponding to a television broadcast band via an antenna, converts the signal into a 58.75 MHz intermediate frequency signal by high-frequency amplifying the received signal and mixing the signal with an oscillation signal from a local oscillator, and outputs the intermediate frequency signal.

The tuner 10 in the present embodiment employs a frequency-synthesizer type tuning mechanism utilizing a so-called PLL. In this mechanism, phase detection is performed between a signal obtained by frequency conversion from a reference signal via a fixed frequency divider and a signal obtained by frequency conversion from the oscillation signal from the local oscillator via a variable frequency divider. Then, the oscillation signal from the local oscillator is feed-back controlled so as to reduce a phase difference between the signals, and when the phase difference is eliminated, the local oscillation is stabled. Note that the frequency division by the variable frequency divider is controlled by a signal outputted from a microcomputer 50 to be described later in accordance with a channel. As the phase difference between the signals is eliminated by the frequency division in accordance with a predetermined channel, the tuning operation to the predetermined channel is completed.

The intermediate frequency signal outputted from the tuner 10 is inputted into a TVIC 20 via a SAW filter 11. The TVIC 20, which is an IC (one-chip IC) comprising a one-chip television video processing circuit, and having a construction as shown in FIG. 3, performs various signal processing. In FIG. 3, the TVIC 20 has a VIF circuit 21 and a signal processing circuit 30. The signal processing circuit 30, comprising a circuit for demodulation of color difference signal and the like, includes a PLL circuit to output a subcarrier for the demodulation.

In the TVIC 20, the intermediate frequency signal is subjected to intermediate-frequency amplification and video detection. Then based on the detection output, predetermined color demodulation processing is performed, and RGB signals are outputted. For this purpose, the intermediate frequency signal shaped to have an ideal frequency band characteristic by the SAW filter 11 is inputted into the VIF circuit 21, then predetermined amplification and video detection are performed on the input signal, and a composite video signal is outputted.

The composite video signal is inputted into a band amplification circuit 31 in the signal processing circuit 30. The band amplification circuit 31 separates a carrier chrominance signal and a color burst signal from the input composite video signal. The carrier chrominance signal is inputted into a color demodulation circuit 32 for extracting a color difference signal. Further, the color burst signal is inputted into a burst amplification circuit 40 in the PLL circuit, in which the signal is subjected to predetermined amplification then inputted into an APC circuit 41, and used as a reference signal in the PLL.

The PLL circuit further has a VCO circuit 42 which is connected to the APC circuit 41, the color demodulation circuit 32, and a quartz oscillator X with natural oscillation of about 3.58 MHz. The VCO circuit 42 controls oscillation of the quartz oscillator X in accordance with an input DC voltage. The oscillation output is inputted into the APC circuit 41 and the color demodulation circuit 32, and further inputted into the tuner 10 via a buffer 12.

The APC circuit 41 compares phases of the output signal from the burst amplification circuit 40 and the output signal from the VCO circuit 42, and outputs a DC voltage corresponding to the difference between the phases. Further, the APC circuit 41 is connected to a loop filter 43, and further, a fixed voltage circuit 44 using resistor frequency division is connected via a switch S between the loop filter 43 and the APC circuit 41. Accordingly, when the switch S is turned ON, the voltage in the previous stage of the loop filter 43 is fixed, and the phase comparison operation by the APC circuit 41 is stopped. Further, the switch S is turned on by an SD signal transmitted from the microcomputer 50 to be described later, and is turned off by the SD signal transmitted from the microcomputer 50.

The output from the quartz oscillator X oscillated by phase comparison with the color burst signal is outputted as a subcarrier to the color demodulation circuit 32. The color demodulation circuit 32 uses the subcarrier to perform synchronous detection on the carrier chrominance signal, and finally outputs the RGB outputs. In this manner, the PLL oscillation unit is constructed with the burst amplification circuit 40, the APC circuit 41, the loop filter 43, the VCO circuit 42 and the quartz oscillator X. The external output unit is constructed with the VCO circuit 42 and the buffer 12. The PLL oscillation control unit is constructed with the microcomputer 50, the switch S and the fixed voltage circuit 44.

The TVIC 20 having the above construction uses the output from oscillation by the one quartz oscillator X as a reference signal for the tuner 10 and a subcarrier for color difference signal demodulation. Note that the TVIC 20 performs audio signal demodulation, horizontal and vertical sync signal separation and the like, as well as the color difference signal demodulation. The TVIC 20 outputs the horizontal and vertical sync signals (SYNC) to a CRT for horizontal and vertical drive and to the microcomputer 50 for detection of completion of tuning operation.

When the tuning operation by the tuner 10 is not completed, it is necessary to stop the phase comparison operation by the APC circuit 41 and perform the phase comparison operation after the completion of the tuning operation. The microcomputer 50 control such timings. For this purpose, the microcomputer 50, the tuner 10, the TVIC 20 and the like are connected to a predetermined IIC bus via which interactive communication is possible.

The start of tuning operation is detected by utilizing a user's manipulating a remote control unit. That is, the user uses a remote control unit 60 to perform a desired operation such as channel selection. When the user perform a predetermined operation, an infrared signal corresponding to the operation is outputted. Then, the infrared signal is received by an infrared signal receptor in the television apparatus, and the microcomputer 50 performs processing corresponding to the signal. In the present embodiment, when the user performs channel change operation and the microcomputer 50 receives a signal indicating the channel change, the microcomputer outputs a signal via the IIC bus to turn the switch S on, to stop the phase comparison operation by the APC circuit 41.

Further, upon channel change, the channel to be selected is detected based on the received infrared signal, and corresponding frequency data is transmitted via the IIC bus to the tuner 10. Then the tuner 10 changes frequency division by the variable frequency divider to perform local oscillation by the PLL for reception of the channel frequency, so as to be tuned to the channel frequency based on the frequency data.

Further, the microcomputer 50 is supplied with the sync signal from the TVIC 20. The microcomputer 50 samples the interval between the horizontal sync signals to determine whether or not the current state is a non-video signal state, and outputs the SD signal corresponding to the result of determination to the IIC bus. As the switch S to control the phase comparison operation by the APC circuit 41 is turned off by the SD signal, when the tuning operation has been completed, the phase comparison operation is performed by the APC circuit 41.

Figure 4:
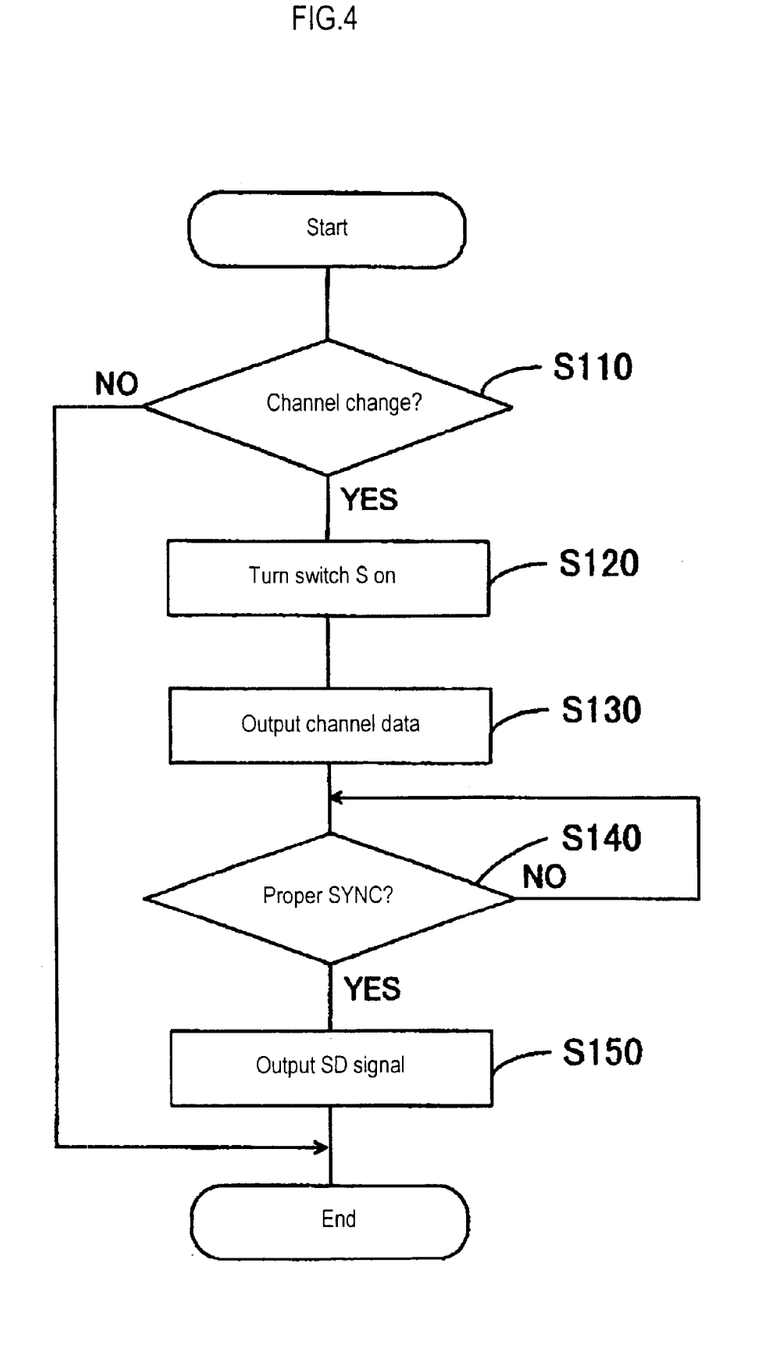
FIG. 4 is a flowchart showing a procedure for controlling the oscillation signal processing apparatus by a microcomputer.

FIG. 4 is a schematic flowchart showing a procedure for controlling the oscillation signal processing apparatus by the microcomputer 50. In FIG. 4, at step S110, the microcomputer 50 determines whether or not the infrared signal based on the channel change operation, outputted from the remote control unit 60, has been received by the infrared signal receptor. If the channel change is discriminated by the infrared signal, a signal to turn the switch S on is transmitted via the IIC bus at step S120.

Then at step S130, the microcomputer 50 transmits a signal to change frequency division of the variable frequency divider (channel data) for tuning to the frequency after the channel change. At this time, the reference signal inputted into the tuner 10 is fixed, and the tuning operation is properly performed. When the tuning operation has been completed, the intermediate frequency signal of the corresponding channel frequency is inputted into the TVIC 20, and the horizontal and vertical sync signals are inputted into the microcomputer 50.

The microcomputer 50 samples the horizontal sync signal. At step S140, the microcomputer 50 determines whether the signal is a proper sync signal based on the sampling data.

If it is determined that a proper sync signal has been inputted, the SD signal is outputted to the IIC bus at step S150. At this time, as the switch S is turned off by the SD signal, the phase comparison operation is performed again by the APC circuit 41, then proper demodulation is performed by the color demodulation circuit 32, and a desired video image is displayed on the CRT.

Figure 5:
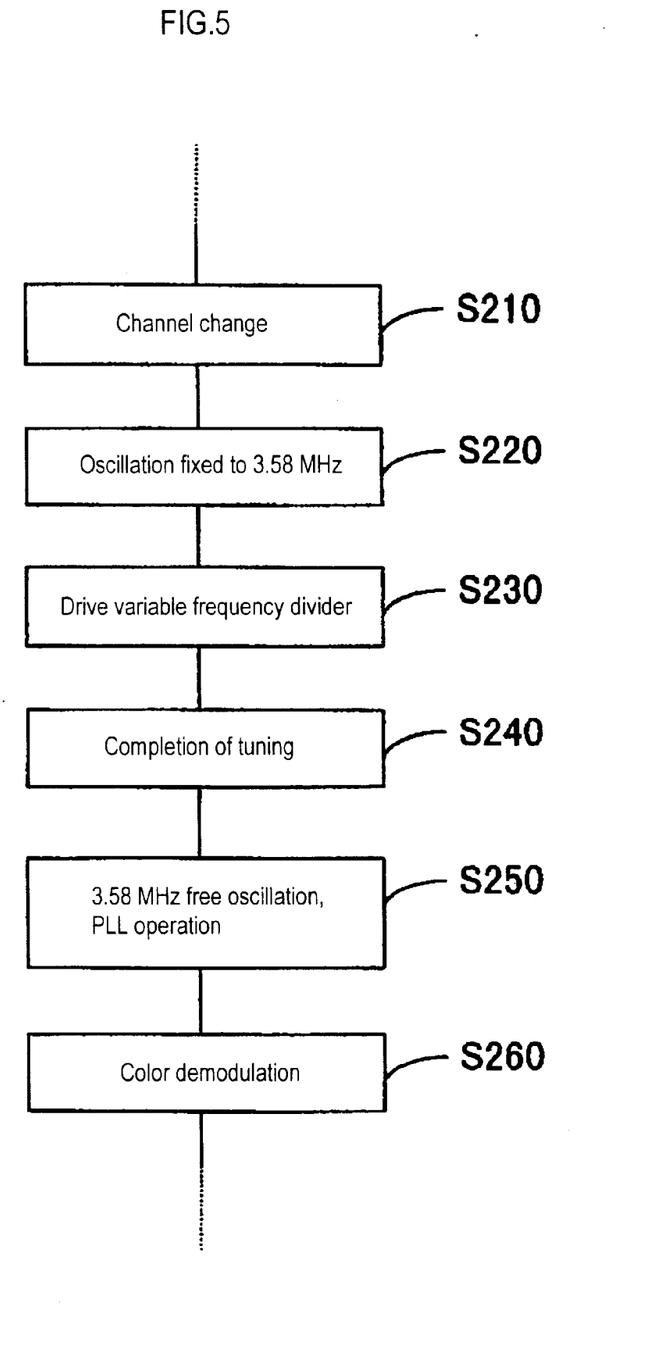
FIG. 5 is a flowchart showing an operation by the television apparatus using the oscillation signal processing apparatus.

Next, the operation of the television apparatus using the oscillation signal processing apparatus as in the above construction will be described. FIG. 5 shows the flow of main processing performed by the television apparatus when the microcomputer 50 performs a series of processing in accordance with channel change as shown in FIG. 4. That is, when the user changes the channel by operating the remote control unit 60 at step S210, the microcomputer 50 determines based on the infrared signal received by the infrared signal receptor that the channel has been changed at step S110. Then at step S120, as the microcomputer 50 turns the switch S on, and the phase comparison is not performed by the APC circuit 41, and oscillation fixed to 3.58 MHz is performed by the quartz oscillator X at step S220. At this time, in the tuner 10, the oscillation signal fixed to 3.58 MHz is used as the tuner PLL reference signal.

Next, at step S130, the microcomputer 50 outputs the channel data via the IIC bus. Then at step S230, in the tuner 10, the variable frequency divider is driven, and the PLL operation is performed with frequency division for reception of the channel between the local oscillation and the reference signal. Accordingly, during the tuning operation, PLL is made by using the reference signal fixed to 3.58 MHz, thus the tuning is completed at step S240 without tuning error or tuning shift.

When the tuning has been completed, the intermediate frequency signal is inputted into the TVIC 20, and the input intermediate frequency signal is inputted into the signal processing circuit 30 as the composite video signal via the VIF circuit 21. At this time, the horizontal and vertical sync signals are inputted into the microcomputer 50, and the microcomputer 50 determines whether or not the input sync signal is a proper signal at step S140. If it is determined the input sync signal is proper, the microcomputer 50 outputs the SD signal onto the IIC bus at step S150.

When the SD signal is outputted onto the IIC bus, the switch S is turned off, and the phase comparison operation is performed by the APC circuit 41. Then the quartz oscillator X performs 3.58 MHz free oscillation at step S250. In the PLL circuit in the signal processing circuit 30, the color burst signal is separated by the band amplification circuit 31, and the separated signal is amplified by the burst amplification circuit 40 as the reference signal for the APC circuit 41. The APC circuit 41 uses the reference signal in the phase comparison operation so as to synchronize the oscillation by the quartz oscillator X to the color burst signal. As a result, a signal synchronized with the color burst signal is outputted as the subcarrier from the VCO circuit 42, and the color demodulation circuit 32 properly demodulates the carrier chrominance signal based on the subcarrier at step S260. Thus RGB outputs to display a proper color image can be obtained.

As described above, according to the present invention, as the phase comparison operation can be stopped upon start of tuning operation, proper tuning can be performed. To stop the phase comparison operation, various constructions can be used. The fixed voltage circuit 44 may have various constructions. Further, the switch S may be realized as a switching transistor in the TVIC 20 and may be realized as an external switch on/off controlled by the microcomputer 50.

Further, the construction to stop the phase comparison operation is not limited to the construction to fix the voltage in the previous stage to the loop filter 43. For example, in the above embodiment, the gain of the burst amplification circuit 40 may be reduced to a minimum. In this case, the gain of the burst amplification circuit 40 is controllable to be controlled by the microcomputer 50 via the IIC bus, and the gain is minimized upon start of tuning operation.

In addition to the reduction of the gain of the burst amplification circuit 40 to a minimum, the phase comparison operation may be stopped by blocking a signal line necessary for the phase comparison operation in the PLL circuit. For example, the band amplification circuit 31 and the burst amplification circuit 40 are wired via a switching transistor, and the wiring is broken upon start of tuning operation. Further, it may be arranged such that the APC circuit 41 and the VCO circuit 42 are wired via a switching transistor, and the wiring is broken upon start of tuning operation.

As described above, according to the present invention, in a construction to use one quartz oscillator to obtain a tuner reference signal and a subcarrier to demodulate color difference signal, when tuning operation is not performed, a PLL operation is performed with the quartz oscillator and a color burst signal, while when the tuning operation is performed, the phase comparison operation is stopped and oscillation is fixed to 3.58 MHz. Accordingly, an oscillation signal processing apparatus capable of stable tuning operation can be provided.

The present invention is not limited to the above embodiments and various changes and modifications can be made within the spirit and scope of the present invention. Therefore, to appraise the public of the scope of the present invention, the following claims are made.

We claim:

1. An oscillation signal processing apparatus for oscillating a subcarrier to demodulate a color difference signal from a carrier chrominance signal, comprising:

PLL oscillation unit that performs predetermined oscillation synchronized with a color burst signal by a predetermined PLL and outputting an oscillation output as the subcarrier;

external output unit that outputs the oscillation output from said PLL oscillation unit as a reference signal for an external tuner; and PLL oscillation control unit that controls said PLL oscillation unit to stop a phase comparison operation upon start of tuning operation by said external tuner, so as to stabilize the reference signal from said external output unit;

wherein said PLL oscillation unit has a burst amplification circuit which performs predetermined amplification so as to reduce amplitude variation of the color burst signal before the phase comparison operation, and wherein said PLL oscillation control unit has a switch to reduce a gain of the burst amplification circuit to a minimum.

2. The oscillation signal processing apparatus according to claim 1, wherein said PLL oscillation unit has an APC circuit which inputs the oscillated subcarrier and a signal based on the color burst signal and compares phases of both signals, and a loop filter connected to the APC circuit, and wherein said PLL oscillation control unit has a switch which fixes a voltage in a connection point between the APC circuit and the loop filter.

3. The oscillation signal processing apparatus according to claim 1, wherein said PLL oscillation control unit detects the start of tuning operation by detecting occurrence/non-occurrence of station-selection operation by a user.

4. The oscillation signal processing apparatus according to claim 1, wherein said PLL oscillation control unit performs a mode selection operation for selection between a fixed oscillation mode to stop the phase comparison operation by said PLL oscillation unit and perform predetermined oscillation and a phase comparison oscillation mode to perform a in-phase comparison operation, and said PLL oscillation control unit selects the fixed oscillation mode during a period from the start of tuning operation to the end of tuning operation.

5. A television apparatus comprising:

a tuner, having a variable frequency divider, which inputs a predetermined reference oscillation signal and receives a television signal by a frequency synthesizer method;

a one-chip IC which inputs an intermediate frequency signal outputted from said tuner via an SAW filter, performs intermediate-frequency amplification and video detection on the signal, then performs predetermined color demodulation processing based on a detection output and outputs RGB signals, and which outputs the reference oscillation signal through an internal PLL circuit to said tuner via a buffer; and a microcomputer which controls said tuner and signal processing by said one-chip IC, wherein said microcomputer utilizes an oscillation signal from one quartz oscillator to output the reference oscillation signal to said tuner and to perform an internal phase comparison, operation, and wherein said microcomputer does not perform the internal phase comparison operation during a tuning operation by said tuner.

6. An oscillation signal processing control method for controlling an oscillation signal processing circuit, having a PLL oscillation circuit which performs predetermined oscillation synchronized with a color burst signal by a predetermined PLL and outputs an oscillation output as the subcarrier and an external output circuit which outputs the oscillation output from said PLL oscillation circuit as a reference signal for an external tuner, to oscillate a subcarrier to demodulate a color difference signal from a carrier chrominance signal, wherein the PLL oscillation circuit has a burst amplification circuit which performs predetermined amplification so as to reduce amplitude variation of the color burst signal before a phase comparison operation, wherein the reference signal from said external output circuit is stabilized by controlling said PLL oscillation circuit to stop the phase comparison operation upon start of tuning by said external tuner, a switch being provided for controlling said PLL oscillation circuit to reduce a gain of the burst amplification circuit to a minimum.

* * * * *